United States Patent
Tsai et al.

(10) Patent No.: US 10,382,172 B2
(45) Date of Patent: Aug. 13, 2019

(54) HYBRID ORTHOGONAL FREQUENCY DIVISION MULTIPLE ACCESS SYSTEM AND METHOD

(71) Applicant: Intel Corporation, Santa Clara, CA (US)

(72) Inventors: Yingming Tsai, Boonton, NJ (US); Guodong Zhang, Syosset, NY (US); Kyle Jung-Lin Pan, St. James, NY (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/791,113

(22) Filed: Jul. 2, 2015

(65) Prior Publication Data

US 2015/0326357 A1 Nov. 12, 2015

Related U.S. Application Data

(63) Continuation of application No. 14/164,670, filed on Jan. 27, 2014, now Pat. No. 9,077,488, which is a
(Continued)

(51) Int. Cl.
*H04L 5/00* (2006.01)
*H04L 27/26* (2006.01)

(52) U.S. Cl.
CPC .......... *H04L 5/0007* (2013.01); *H04L 5/0016* (2013.01); *H04L 5/0037* (2013.01);
(Continued)

(58) Field of Classification Search
CPC ... H04L 5/0007; H04L 5/0016; H04L 5/0037; H04L 5/0044; H04L 27/2647; H04L 27/2601; H04L 5/0073; H04L 5/005
(Continued)

(56) References Cited

U.S. PATENT DOCUMENTS 6,754,169 B2 6/2004 Baum et al.
6,795,424 B1 9/2004 Kapoor et al.
(Continued)

FOREIGN PATENT DOCUMENTS

CN 1547818 11/2004
EP 496632 7/1992
(Continued)

OTHER PUBLICATIONS

Certificate of Patent, Japanese Application No. 2013-252932, 2 pages.
(Continued)

*Primary Examiner* — Faisal Choudhury
(74) *Attorney, Agent, or Firm* — Womble Bond Dickinson (US) LLP

(57) ABSTRACT

A hybrid orthogonal frequency division multiple access (OFDMA) system including a transmitter and a receiver is disclosed. The transmitter includes a first spread OFDMA subassembly, a first non-spread OFDMA subassembly and a first common subassembly. The first spread OFDMA subassembly spreads input data and maps the spread data to a first group of subcarriers. The first non-spread OFDMA subassembly maps input data to a second group of subcarriers. The first common subassembly transmits the input data mapped to the first and second group of subcarriers using OFDMA. The receiver includes a second spread OFDMA subassembly, a second non-spread OFDMA subassembly and a second common subassembly. The second common subassembly processes received data to recover data mapped to the subcarriers using OFDMA. The second spread OFDMA subassembly recovers the first input data by separating user data in a code domain and the second non-spread OFDMA subassembly recovers the second input data.

9 Claims, 3 Drawing Sheets

Related U.S. Application Data continuation of application No. 13/706,811, filed on Dec. 6, 2012, now Pat. No. 8,767,795, which is a continuation of application No. 13/236,147, filed on Sep. 19, 2011, now Pat. No. 8,340,153, which is a continuation of application No. 12/776,769, filed on May 10, 2010, now Pat. No. 8,023,551, which is a continuation of application No. 11/406,878, filed on Apr. 19, 2006, now Pat. No. 7,715,460.

(60) Provisional application No. 60/673,872, filed on Apr. 22, 2005.

(52) U.S. Cl.
CPC .......... *H04L 5/0044* (2013.01); *H04L 5/0073* (2013.01); *H04L 27/2601* (2013.01); *H04L 27/2647* (2013.01); *H04L 5/005* (2013.01)

(58) Field of Classification Search
USPC .......................................................... 370/330
See application file for complete search history.

(56) References Cited

U.S. PATENT DOCUMENTS

| | | | |
|---|---|---|---|
| 7,016,649 B1* | 3/2006 | Narasimhan | H01Q 1/246 455/552.1 |
| 7,158,474 B1* | 1/2007 | Gerakoulis | H04B 1/109 370/206 |
| 7,397,839 B2* | 7/2008 | Maeda | H04L 5/026 370/208 |
| 7,420,915 B2 | 9/2008 | Murakami et al. | |
| 7,483,472 B2 | 1/2009 | Oh et al. | |
| 7,577,124 B2 | 8/2009 | Yomo et al. | |
| 7,724,638 B2 | 5/2010 | Murakami et al. | |
| 7,764,594 B2 | 7/2010 | Walton et al. | |
| 7,864,725 B2 | 1/2011 | Li et al. | |
| 7,903,748 B2 | 3/2011 | Adachi | |
| 7,983,357 B2 | 7/2011 | Kim et al. | |
| 2002/0119781 A1 | 8/2002 | Li et al. | |
| 2003/0053413 A1 | 3/2003 | Sawahashi et al. | |
| 2003/0081538 A1 | 5/2003 | Walton et al. | |
| 2003/0112744 A1 | 6/2003 | Baum et al. | |
| 2003/0215001 A1 | 11/2003 | Lemois et al. | |
| 2004/0174812 A1 | 9/2004 | Murakami et al. | |
| 2004/0213144 A1 | 10/2004 | Murakami et al. | |
| 2004/0228267 A1 | 11/2004 | Agrawal et al. | |
| 2004/0257980 A1* | 12/2004 | Yeh | H04L 27/2628 370/210 |
| 2004/0264548 A1 | 12/2004 | Miyoshi | |
| 2005/0063327 A1* | 3/2005 | Krauss | H04L 5/0021 370/320 |
| 2005/0175116 A1* | 8/2005 | Feher | H04B 1/69 375/267 |
| 2006/0104335 A1* | 5/2006 | Trachewsky | H04J 13/00 375/141 |
| 2006/0198292 A1 | 9/2006 | Yoshii et al. | |
| 2006/0262871 A1 | 11/2006 | Cho et al. | |
| 2007/0030883 A1 | 2/2007 | Saidi et al. | |
| 2007/0147539 A1 | 6/2007 | Gorokhov et al. | |
| 2007/0189240 A1 | 8/2007 | Cho et al. | |
| 2007/0202816 A1 | 8/2007 | Zheng | |
| 2007/0250638 A1 | 10/2007 | Kiran et al. | |
| 2007/0263735 A1 | 11/2007 | Tong et al. | |
| 2008/0212656 A1* | 9/2008 | Feher | H04L 27/34 375/150 |
| 2011/0007657 A1 | 1/2011 | Kazmi et al. | |
| 2016/0254889 A1* | 9/2016 | Shattil | H04L 5/0035 370/329 |

FOREIGN PATENT DOCUMENTS

| | | |
|---|---|---|
| EP | 1246386 | 10/2002 |
| EP | 1416657 | 5/2004 |
| EP | 1496632 | 1/2005 |
| EP | 1872480 | 1/2008 |
| GB | 2394871 | 5/2004 |
| JP | 2000138974 | 5/2000 |
| JP | 2002-190788 | 7/2002 |
| JP | 2002528958 | 9/2002 |
| JP | 2003-503934 | 1/2003 |
| JP | 2003-110530 | 4/2003 |
| JP | 2003-152679 | 5/2003 |
| JP | 2003249911 | 9/2003 |
| JP | 2003-333011 | 11/2003 |
| JP | 2004-158901 | 6/2004 |
| JP | 2004-193670 | 7/2004 |
| JP | 2004-304267 | 10/2004 |
| JP | 2005244960 | 9/2005 |
| JP | 20080237170 | 10/2007 |
| JP | 2008-537451 | 9/2008 |
| JP | 2008537451 | 9/2008 |
| JP | 2010107683 | 5/2010 |
| KR | 10-2004-0053183 | 6/2004 |
| RU | 2323535 | 4/2008 |
| TW | 556423 | 10/2003 |
| TW | 562343 | 11/2003 |
| TW | 563968 | 11/2003 |
| TW | 565075 | 12/2003 |
| TW | 200409506 | 6/2004 |
| TW | 200509578 | 3/2005 |
| WO | WO-2000024151 | 4/2000 |
| WO | WO-02/31991 | 4/2002 |
| WO | WO-03/021834 | 3/2003 |
| WO | WO-20030021834 | 3/2003 |
| WO | WO-2004/056022 | 7/2004 |
| WO | WO-2004075419 | 9/2004 |
| WO | WO-2004/102815 | 11/2004 |
| WO | WO-2005/036790 | 4/2005 |
| WO | WO-2005/036894 | 4/2005 |
| WO | WO-2006/003761 | 1/2006 |
| WO | WO-200103319 | 1/2009 |

OTHER PUBLICATIONS

Taiwanese Allowance Decision dated Jan. 30, 2016, Taiwanese Application No. 103127085, 2 pages.
Decision to Grant Patent for Japanese Patent Application No. 2014-165151, dated Apr. 5, 2016, 3 pages.
Notice of Reexamination for Chinese (+English Translation) Application No. 201110118212.6 dated Apr. 1, 2016, 20 pages.
Notice to Grant, Norwegian Application No. 20075899, dated May 2, 2016, 2 pages.
Decision to Refuse (+ English Translation) for Japanese Application No. 2014-165150, dated Apr. 5, 2016, 8 pages.
Kishiyama, Yoshihisa , et al., "Investigation of Pilot Channel Structur4e for VSF-OFCDM Broadband Wireless Access", 19-24.
Decision on Reexamination (+ English Translation) on Chinese Application No. 201110118212.6 dated Jun. 28, 2016, 26 pages.
International Search Report for International Application No. PCT/US2006/014947 dated May 11, 2007, 2 pages.
Written Opinion for International Application No. PCT/US2006/014947 dated May 11, 2007, 3 pages.
International Preliminary Report on Patentability for International Application No. PCT/US2006/014947 dated Oct. 23, 2007, 4 pages.
Office Action for Japanese Application No. 2011-024062 dated Aug. 6, 2013, 5 pages.
European Search Report for European Patent Application No. 13185444.0 dated Dec. 5, 2013, 11 pages.
Final Rejection for Japanese Patent Application No. 2011-024062 dated Apr. 8, 2014, 6 pages.
First Examination Report for Indian Application No. 8197/DELNP/2007 dated Sep. 10, 2013, 2 pages.
Non-Final Office Action for U.S. Appl. No. 13/706,811 dated Apr. 24, 2013, whole document.
Office Action with Search for Taiwan Application No. 095114007, (dated Sep. 7, 2012), whole document.
Notice of Reasons for Rejection dated Apr. 22, 2015 (+ English translation), in Japanese Patent Application No. 2013-252932, 8 pages.

(56) References Cited

OTHER PUBLICATIONS

Notice of Reasons for Rejection dated Apr. 22, 2015 (+ English translation), in Japanese Patent Application No. 2014-165150, 8 pages.
Notice of Reasons for Rejection dated Apr. 22, 2015 (+ English translation), in Japanese Patent Application No. 2014-165151, 11 pages.
Notice of Reasons for Rejection dated Nov. 10, 2015 (+ English translation), in Japanese Patent Application No. 2014-165151, 6 pages.
Notice of Reasons for Rejection dated Nov. 17, 2015 (+ English translation), in Japanese Patent Application No. 2014-165150, 8 pages.
Notice of Reexamination dated May 28, 2015 (+ English translation), in Chinese Patent Application No. 201110118212.6, 16 pages.
Notice of Reexamination dated Oct. 30, 2015 (+ English translation), in Chinese Patent Application No. 201110118212.6, 14 pages.
NTT DOCOMO, "Downlink Multiple Access Scheme for Evolved UTRA," 3GPP TSG RAN WG1 Meeting #40bis, R1-050249 (Apr. 4-8, 2005).
Office Action dated Aug. 18, 2015 (+ English translation), in Tawain Patent Application No. 103127086, 6 pages.
Office Action dated Aug. 27, 2015 (+ English translation), in Taiwan Patent Application No. 103127085, 6 pages.
Office Action dated Nov. 20, 2014 (+ English translation) in Japanese Patent Application No. 2013-252932, 12 pages.
Office Action for Chinese Patent Application No. 201110118212.6, dated Jun. 3, 2013, 17 pages.
Office Action for European Patent Application No. 12181941.1, dated Dec. 12, 2012, whole document.
Office Action for Japanese Patent Application No. 2011-024062, dated Jul. 3, 2013, 5 pages.
Office Action dated Dec. 2, 2014, in U.S. Appl. No. 14/164,670, 7 pages.
Official Action dated Aug. 12, 2015 (+ English translation), in Norwegian Patent Application No. 20075899, 3 pages.
Decision to Grant in Taiwanese Application No. 104144680 dated Apr. 6, 2017, 2 pages.
Decision on Reexamination (+ English Translation) Chinese Application No. 201110118212.6 dated Jun. 28, 2016, 26 pgs.
Notice of Allowance in Australian Application No. 2009250999 dated Mar. 21, 2013, 3 pgs.
First Examiner's Report in Australian Application No. 2009250999 dated Jan. 31, 2012, 3 pgs.
Second Examiner's Report in Australian Application No. 2009250999 dated May 2, 2012, 1 page.
Office Action in Canadian Application No. 2,605,657 dated Feb. 10, 2011, 4 pgs.
Notice of Allowance in Canadian Application No. 2,605,657 dated Nov. 6, 2011, 1 page.
English Translation of First Office Action in Chinese Application No. 201110118212.6 dated Feb. 13, 2012, 7 pgs.
Second Office Action (+English Translation) in Chinese Application No. 201110118212.6 dated Nov. 5, 2012, 10 pgs.
Notice of Allowance in European Application No. 06750864.8 dated Oct. 11, 2012, 1 page.
Communication to Rules 70(2) and 70a (2) in European Application No. 13185444.0 dated Jan. 13, 2014, 2 pgs.
Second Office Action in Indonesian Application No. W00 2009 01128 dated Nov. 11, 2013, 2 pgs.
English Translation of Final Decision of Rejection in Japanese Application No. 2008-507884 dated Mar. 11, 2011, 3 pgs.
English Translation of the First Notice of Rejection for Japanese Application No. 2008-507884 dated Jun. 25, 2010, 4 pgs.
Appeal Decision (+English Translation) in Japanese Application No. 2008-507884 dated Oct. 9, 2012, 20 pgs.
English translation of Notice of Final Rejection in Japanese Application No. 2009-176696 dated Mar. 11, 2011, 6 pgs.
Appeal Decision (+English Translation) in Japanese Application No. 2009-176696 dated Oct. 31, 2012, 13 pgs.
Notice of Allowance in Japanese Application No. 2013-252932 dated Nov. 10, 2015, 4 pgs.
Non-Final Office Action in U.S. Appl. No. 11/406,878 dated Dec. 3, 2008 11 pgs.
Final Office Action in U.S. Appl. No. 11/406,878 dated May 20, 2009, 11 pgs.
Notice of Allowance in U.S. Appl. No. 11/406,878 dated Dec. 14, 2009, 7 pgs.
Non-Final Office Action in U.S. Appl. No. 13/236,147 dated Jan. 12, 2012, 12 pgs.
Notice of Allowance in U.S. Appl. No. 13/236,147 dated Aug. 27, 2012, 9 pgs.
Final Office Action for U.S. Appl. No. 13/706,811 dated Sep. 5, 2013, 6 pgs.
Notice of Allowance in U.S. Appl. No. 13/706,811 dated Oct. 7, 2013, 10 pgs.
Non-Final Office Action in U.S. Appl. No. 12/776,769 dated Sep. 27, 2010, 10 pgs.
Second Non-Final Office Action in U.S. Appl. No. 12/776,769 dated Feb. 17, 2011, 9 pgs.
Notice of Allowance in U.S. Appl. No. 12/776,769 dated May 27, 2011, 7 pgs.
English Translation of an Office Action in Korean Application No. 10-2006-0036910 dated May 11, 2012, 4 pgs.
Notice of Allowance (+English Translation) in Korean Application No. 10-2006-0036910 dated Nov. 23, 2012, 3 pgs.
English Translation of First Office Action for Korean Application No. 10-2011-0041100 dated Nov. 28, 2011, 4 pgs.
Second Office Action (+English Translation) in Korean Application No. 10-2011-0041100 dated Sep. 27, 2012, 4 pgs.
Notice of Allowance (+English Translation) in Korean Application No. 10-2011-0041100 dated May 27, 2013, 3 pgs.
English Summary of First Office in Korean Application No. 10-2012-0031950 dated Nov. 11, 2012, 1 page.
English Summary of a Second Office Action for Korean Application No. 10-2012-0031950 dated Dec. 19, 2012, 1 page.
Notice of Allowance (+English Translation) in Korean Application No. 10-2012-0031950 dated May 30, 2013, 3 pgs.
Notice of Allowance (+English Translation) in Korean Application No. 10-2012-0092015 dated May 30, 2013, 3 pgs.
Notice of Allowance in Malaysian Application No. PI20061786 dated Jun. 13, 2014, 2 pgs.
First Office Action (+English Translation) in Norwegian Application No. 20075899 dated Apr. 8, 2015, 2 pgs.
Search Report and Notice of Allowance in Singapore Application No. 201002787-8 dated Mar. 17, 2014, 15 pgs.
Office Action and Search Report (+English Translation) in Taiwanese Application No. 095114007 dated Nov. 19, 2012, 11 pgs.
Notice of Allowance in Taiwanese Application No. 095114007 dated Jul. 8, 2014, 2 pgs.
First Office Action and Search Report (+English Translation) in Taiwanese Application No. 098109628 dated Nov. 19, 2012, 13 pgs.
Second Office Action and Search Report (+English Translation) in Taiwanese Application No. 098109628 dated Apr. 17, 2013, 13 pgs.
Notice of Allowance in Taiwanese Application No. 098109628 dated Jul. 31, 2013, 2 pgs.
Notice of Allowance Taiwanese Patent Application No. 103127086 dated Nov. 27, 2015, 2 pgs.
First Office Action (+English Translation) in Taiwanese Application No. 104144680 dated Dec. 13, 2016, 7 pgs.

* cited by examiner

HYBRID ORTHOGONAL FREQUENCY DIVISION MULTIPLE ACCESS SYSTEM AND METHOD

CROSS-REFERENCE TO RELATED APPLICATIONS

This application is a continuation of U.S. patent application Ser. No. 14/164,670 filed Jan. 27, 2014; which is a continuation of U.S. patent application Ser. No. 13/706,811 filed Dec. 6, 2012, now U.S. Pat. No. 8,767,795 issued Jul. 1, 2014; which is a continuation of U.S. patent application Ser. No. 13/236,147 filed Sep. 19, 2011, now U.S. Pat. No. 8,340,153 issued Dec. 25, 2012; which is a continuation of U.S. patent application Ser. No. 12/776,769 filed May 10, 2010, now U.S. Pat. No. 8,023,551 issued Sep. 20, 2011; which is a continuation of U.S. patent application Ser. No. 11/406,878 filed Apr. 19, 2006, now U.S. Pat. No. 7,715,460 issued May 11, 2010; which claims the benefit of U.S. Provisional Application No. 60/673,872 filed Apr. 22, 2005, which applications are incorporated by reference as if fully set forth.

FIELD OF INVENTION

The present invention is related to wireless communication systems. More particularly, the present invention is related to a hybrid orthogonal frequency division multiple access (OFDMA) system and method.

BACKGROUND

It is expected that future wireless communication systems will provide broadband services such as wireless Internet access to subscribers. Such broadband services require reliable and high throughput transmissions over a wireless channel which is time dispersive and frequency selective. The wireless channel is subject to limited spectrum and inter-symbol interference (ISI) caused by multipath fading. Orthogonal frequency division multiplexing (OFDM) and OFDMA are some of the most promising solutions for next generation wireless communication systems.

OFDM has a high spectral efficiency since the subcarriers used in the OFDM system overlap in frequency and an adaptive modulation and coding scheme (MCS) may be employed across subcarriers. In addition, implementation of OFDM is very simple because the baseband modulation and demodulation are performed by simple inverse fast Fourier transform (IFFT) and fast Fourier transform (FFT) operations. Other advantages of the OFDM system include a simplified receiver structure and excellent robustness in a multipath environment.

OFDM and OFDMA have been adopted by several wireless/wired communication standards, such as digital audio broadcast (DAB), digital audio broadcast terrestrial (DAB-T), IEEE 802.11a/g, IEEE 802.16, asymmetric digital subscriber line (ADSL) and is being considered for adoption in third generation partnership project (3GPP) long term evolution (LTE), cdma2000 evolution, a fourth generation (4G) wireless communication system, IEEE 802.11n, or the like.

One key problem with OFDM and OFDMA is that it is difficult to mitigate or control inter-cell interference to achieve a frequency reuse factor of one. Frequency hopping and subcarrier allocation cooperation between cells have been proposed to mitigate inter-cell interference. However, the effectiveness of both methods is limited.

SUMMARY

The present invention is related to a hybrid OFDMA system and method. The system includes a transmitter and a receiver. The transmitter includes a first spread OFDMA subassembly, a first non-spread OFDMA subassembly and a first common subassembly. The first spread OFDMA subassembly spreads input data and maps the spread data to a first group of subcarriers. The first non-spread OFDMA subassembly maps input data to a second group of subcarriers. The first common subassembly transmits the input data mapped to the first group of subcarriers and the second group of subcarriers using OFDMA. The receiver includes a second spread OFDMA subassembly, a second non-spread OFDMA subassembly and a second common subassembly. The second common subassembly of the receiver processes received data to recover data mapped to the subcarriers using OFDMA. The second spread OFDMA subassembly recovers the first input data by separating user data in a code domain and the second non-spread OFDMA subassembly recovers the second input data.

DETAILED DESCRIPTION OF THE PREFERRED EMBODIMENTS

Hereafter, the terminology "transmitter" and "receiver" includes but are not limited to a user equipment (UE), a wireless transmit/receive unit (WTRU), a mobile station, a fixed or mobile subscriber unit, a pager, a Node-B, a base station, a site controller, an access point or any other type of device capable of operating in a wireless environment.

The features of the present invention may be incorporated into an integrated circuit (IC) or be configured in a circuit comprising a multitude of interconnecting components.

The present invention is applicable to any wireless communication system that utilizes OFDMA (or OFDM) and/or code division multiple access (CDMA), such as IEEE 802.11, IEEE 802.16, third generation (3G) cellular systems, 4G systems, satellite communication systems, or the like.

Figure 1:
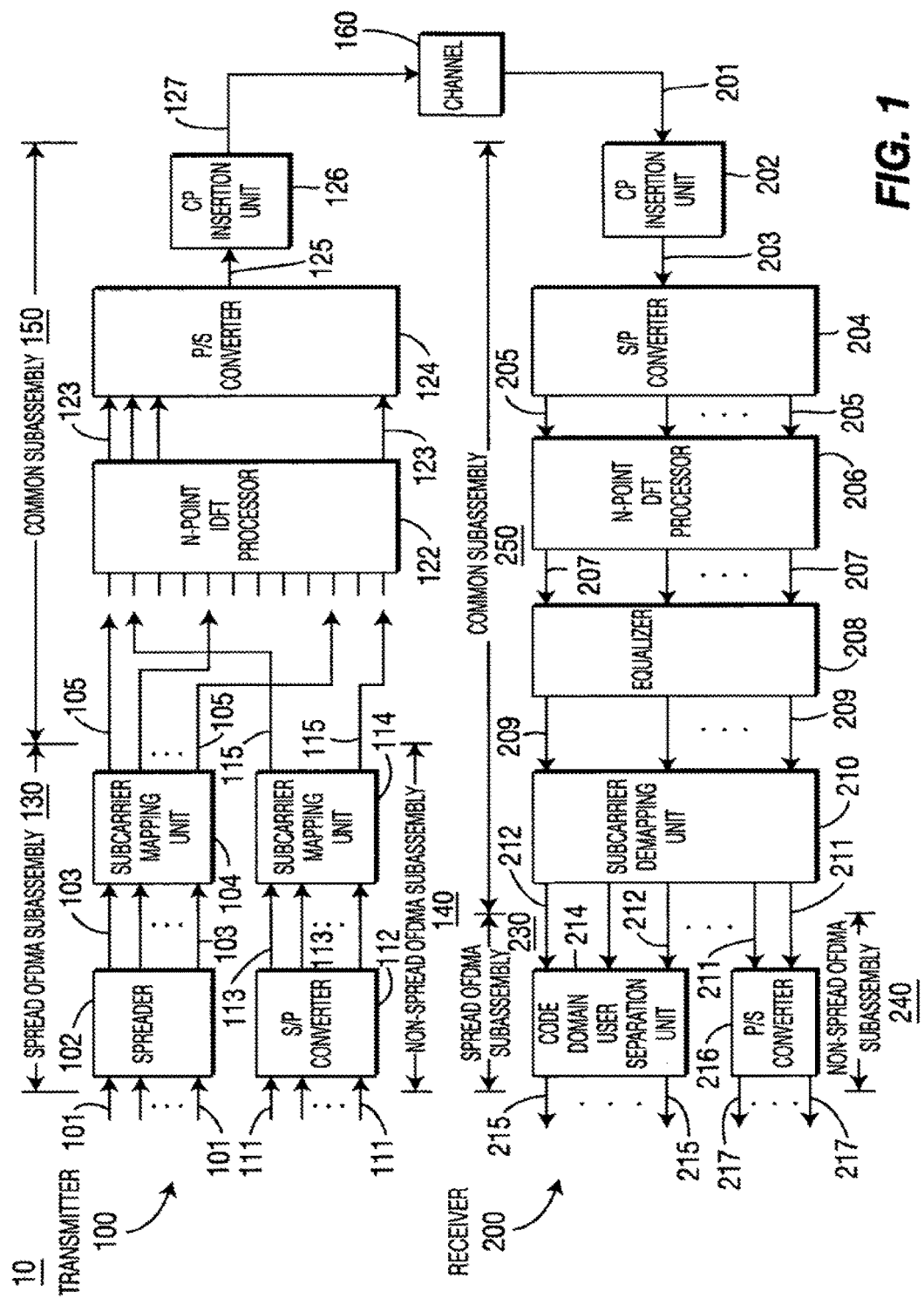
FIG. 1 is a block diagram of an exemplary hybrid OFDMA system configured in accordance with the present invention.

FIG. 1 is a block diagram of an exemplary hybrid OFDMA system 10 including a transmitter 100 and a receiver 200 in accordance with the present invention. The transmitter 100 includes a spread OFDMA subassembly 130, a non-spread OFDMA subassembly 140 and a common subassembly 150. In the spread OFDMA subassembly 130, input data 101 (for one or more users) is spread with a spreading code to generate a plurality of chips 103 and the chips 103 are then mapped to subcarriers. In the non-spread OFDMA subassembly 140, input bit 111 (for one or more different users) is mapped to subcarriers without spreading.

The spread OFDMA subassembly 130 includes a spreader 102 and a first subcarrier mapping unit 104. The non-spread OFDMA subassembly 140 includes a serial-to-parallel (S/P) converter 112 and a second subcarrier mapping unit 114. The common subassembly 150 includes an N-point inverse discrete Fourier transform (IDFT) processor 122, a parallel-to-serial (P/S) converter 124 and a cyclic prefix (CP) insertion unit 126.

Assuming that there are N subcarriers in the system and that K different users communicate at the same time in the system, among K users, data to $K_s$ users is transmitted via the spread OFDMA subassembly 130. The number of subcarriers used in the spread OFDMA subassembly 130 and the non-spread OFDMA subassembly 140 are $N_s$ and $N_o$, respectively. The values of $N_s$ and $N_o$ satisfy the conditions that $0 \leq N_s \leq N$, $0 \leq N_o \leq N$, and $N_s + N_o \leq N$.

The input data 101 is spread by the spreader 102 to a plurality of chips 103. The chips 103 are mapped to the $N_s$ subcarriers by the subcarrier mapping unit 104. The spreading may be performed in the time domain, in the frequency domain, or both. For a particular user, spreading factors in the time domain and the frequency domain are denoted by $SF_t$ and $SF_f$, respectively. A joint spreading factor for the user is denoted by $SF_{joint}$, which equals to $SF_t \times SF_f$. When $SF_t = 1$, the spreading is performed only in the frequency domain, and when $SF_f = 1$, the spreading is performed only in the time domain. A frequency domain spreading for user i is limited to the number of subcarriers allocated to the user i, $N_s(i)$. The allocation of subcarriers can be static or dynamic. In the case where $N_s(i) = N_s$ for every user i, the spread OFDMA becomes spread OFDM.

One subcarrier may be mapped to more than one user in the spread OFDMA subassembly 130. In such case input data 101 of two or more users mapped to the same subcarrier are code multiplexed, and therefore, should be spread using different spreading codes. If spreading is performed both in the time and frequency domain, spreading codes assigned to users may be different in the time domain, in the frequency domain, or both.

Figure 2:
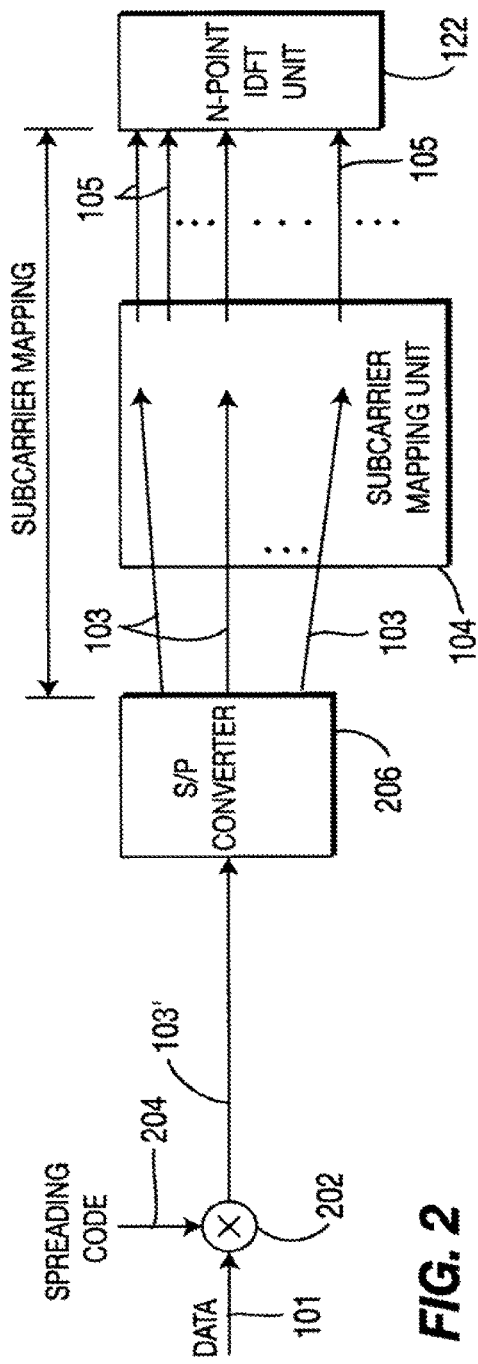
FIG. 2 shows an example of frequency domain spreading and subcarrier mapping in accordance with the present invention.

FIG. 2 shows an example of frequency domain spreading and subcarrier mapping in accordance with the present invention. The input data 101 is multiplied with a spreading code 204 by a multiplier 202 to generate a plurality of chips 103'. The chips 103' are converted to parallel chips 103 by an S/P converter 206. Each of the parallel chips 103 is then mapped to one of the subcarriers by the subcarrier mapping unit 104 before being sent to the IDFT processor 122.

Figure 3:
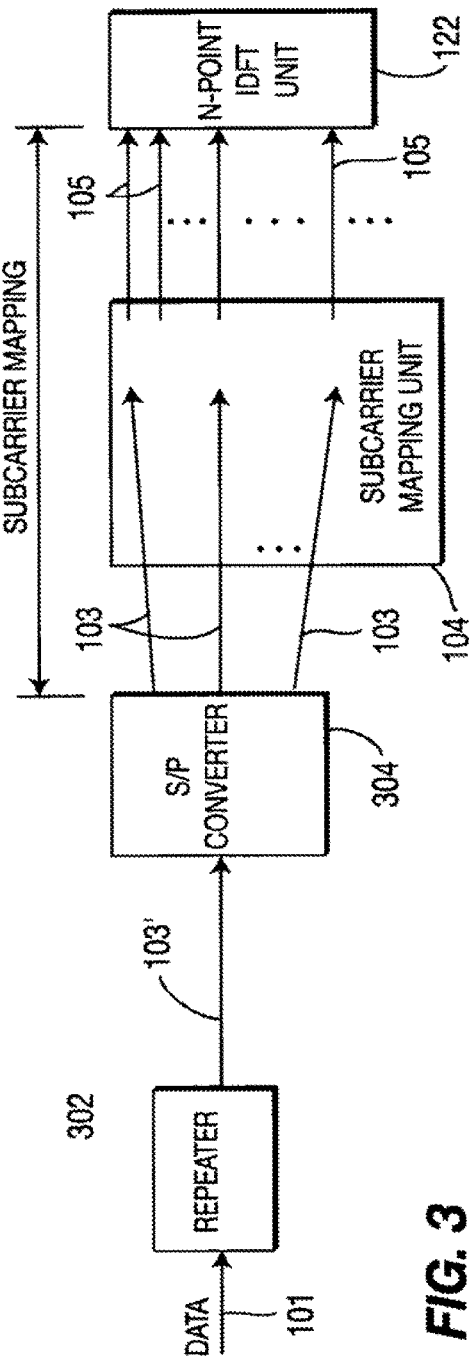
FIG. 3 shows another example of spreading and subcarrier mapping in accordance with the present invention.

FIG. 3 shows another example of frequency domain spreading and subcarrier mapping in accordance with the present invention. Instead of multiplying a spreading code by a spreader, a repeater 302 may be used to repeat each input data 101 multiple times at the chip rate to generate chips 103'. The chips 103' are then converted to parallel chips 103 by an S/P converter 304. Each of the parallel chips 103 is mapped to one of the subcarriers by the subcarrier mapping unit 104 before being sent to the IDFT processor 122.

Alternatively, when input data is spread in the time domain, each input data is spread by a spreader to generate a plurality of chip streams and the chip streams are mapped to subcarriers. In such case, the time domain spreading may also be performed by simple repetition of the input data without using a spreading code.

Common pilots may be transmitted on the subcarriers used in the spread OFDMA subassembly 130. In order to distinguish from other user data, common pilots are also spread.

Referring again to FIG. 1, in the non-spread OFDMA subassembly 140, input bits 111 of different users are converted to parallel bits 113 by the S/P converter 112. The subcarrier mapping unit 114 allocates users to one or more subcarriers, such that each subcarrier is used by at most one user and bits from each user are mapped to the allocated subcarriers for the user by the subcarrier mapping unit. In this way, users are multiplexed in the frequency domain. The number of subcarriers allocated to user i is denoted by $N_o(i)$, $0 \leq N_o(i) \leq N_o$. The allocation of subcarriers can be static or dynamic.

In accordance with the present invention, time-frequency hopping may be performed for the non-spread OFDMA subassembly 140 in a pseudo-random way in each cell. With time domain hopping, the users that transmit in a cell change from time to time, (i.e., over one or several OFDM symbols or frames). With frequency domain hopping, subcarriers allocated to users that transmit in a cell are hopping per one or several OFDM symbols or frames. In this way, the inter-cell interference can be mitigated and averaged among the users and cells.

Figure 4:
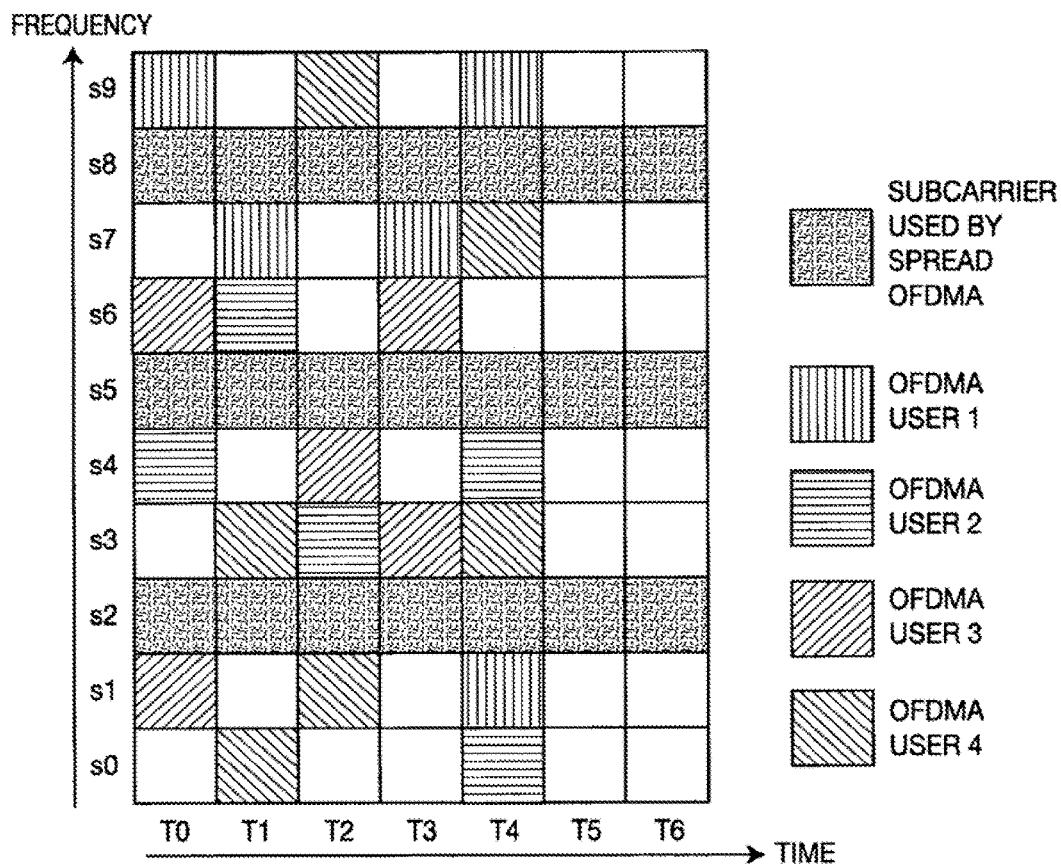
FIG. 4 shows an example of time-frequency hopping of subcarriers in accordance with the present invention.

FIG. 4 illustrates an example of time-frequency hopping where ten (10) subcarriers, s0-s9, are used for time periods of T0-T6 in accordance with the present invention. As an example, in FIG. 2, subcarriers s3, s5, s8 are used for spread OFDMA and the remaining subcarriers are used for non-spread OFDMA. For the subcarriers allocated for non-spread OFDMA, subcarriers and time periods allocated to users are hopping in a pseudo-random way. For example, data for user 1 is transmitted via s9 at T0, s7 at T1, s7 at T3, and s1 and s9 at T4, and data for user 2 is transmitted via s4 at T0, s6 at T1, s3 at T2, s0 and s4 at T4. Therefore, data to different users is transmitted over different OFDM symbols or frames and inter-cell interference is mitigated.

Referring again to FIG. 1, both the chips 105 and the data 115 are fed into the IDFT processor 122. The IDFT processor 122 converts the chips 105 and data 115 to time domain data 123. The IDFT may be implemented by IFFT or an equivalent operation. The time domain data 123 is then converted to a serial data 125 by the P/S converter 124. A CP, (also known as a guard period (GP)), is then added to the serial data 125 by the CP insertion unit 126. Data 127 is then transmitted via the wireless channel 160.

The receiver 200 includes a spread OFDMA subassembly 230, a non-spread OFDMA subassembly 240 and a common subassembly 250 for hybrid OFDMA. The common subassembly 250 includes a CP removal unit 202, a P/S converter 204, an N-point discrete Fourier transform (DFT) processor 206, an equalizer 208 and a subcarrier demapping unit 210. The spread OFDMA subassembly 230 includes a code domain user separation unit 214 and the non-spread OFDMA subassembly 240 includes a P/S converter 216.

The receiver 200 receives data 201 transmitted via the channel. A CP is removed from received data 201 by the CP removal unit 202. Data 203 after the CP is removed, which is time domain data, is converted to parallel data 205 by the S/P converter 204. The parallel data 205 is fed to the DFT processor 206 and converted to frequency domain data 207, which means N parallel data on N subcarriers. The DFT may be implemented by FFT or equivalent operation. The frequency domain data 207 is fed to the equalizer 208 and equalization is performed to data at each subcarrier. As in a conventional OFDM system, a simple one-tap equalizer may be used.

After equalization at each subcarrier, data corresponding to a particular user is separated by the subcarrier demapping unit 210, which is an opposite operation performed by the subcarrier mapping units 104, 114 at the transmitter 100. In the non-spread OFDMA subassembly 240, each user data 211 is simply converted to a serial data 217 by the S/P converter 216. In the spread OFDMA subassembly 230, data 212 on the separated subcarriers are further processed by the code domain user separation unit 214. Depending on the way spreading is performed at the transmitter 100 corresponding user separation is performed in the code domain user separation unit 214. For example, if the spreading is performed only in the time domain at the transmitter 100, a conventional Rake combiner may be used as the code domain user separation unit 214. If the spreading is performed only in the frequency domain at the transmitter 100, a conventional (frequency domain) despreader may be used as the code domain user separation unit 214. If the spreading is performed in both the time domain and the frequency domain at the transmitter 100, a time-frequency Rake combiner may be used as the code domain user separation unit 214.

Figure 5:
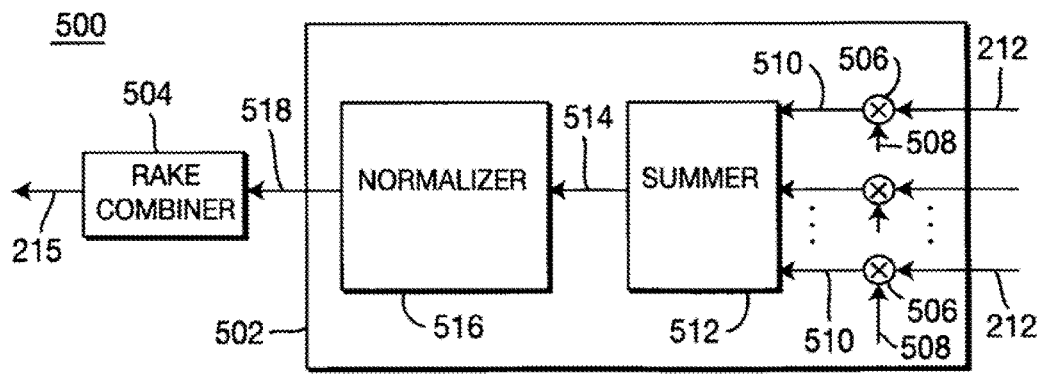
FIG. 5 is a block diagram of an exemplary time-frequency Rake combiner configured in accordance with the present invention.

FIG. 5 is a block diagram of an exemplary time-frequency Rake combiner 500 configured in accordance with the present invention. The time-frequency Rake combiner 500 performs processing at both time and frequency domains in order to recover data that is spread in both time and frequency domains at the transmitter 100. It should be noted that the time-frequency Rake combiners 500 may be implemented in many different ways and the configuration shown in FIG. 5 is provided as an example, not as a limitation, and the scope of the present invention is not limited to the structure shown in FIG. 5.

The time-frequency Rake combiner 500 comprises a despreader 502 and a Rake combiner 504. Data 212 separated and collected for a particular user by the subcarrier demapping unit 210 in FIG. 1 for the spread OFDMA subassembly 230 is forwarded to the despreader 502. The despreader 502 performs frequency-domain despreading to the data 212 on the subcarriers. The despreader 502 includes a plurality of multipliers 506 for multiplying conjugate 508 of the spreading codes to the data 212, a summer 512 for summing the multiplication outputs 510, and a normalizer 516 for normalizing the summed output 514. The despreader output 518 is then processed by the Rake combiner 504 to recover the data of the user by time domain combining.

Referring again to FIG. 1, the transmitter 100, the receiver 200, or both may include multiple antennas and may implement hybrid OFDMA in accordance with the present invention with multiple antennas either at transmitter side, the receiver side, or both.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An apparatus comprising:
   a plurality of transmission path circuits comprising:
      a spreader circuit that is configured to spread a first input data to generate parallel chips, the first input data being from a first set of users;
      a first mapping circuit that is configured to map each of the parallel chips to a first set of subcarriers including one or more subcarriers;
      a converter circuit that is configured to convert a second input data to parallel bits, the second input data being from a second set of users; and
      a second mapping circuit that is configured to allocate each user of the second set of users to a second set of subcarriers including one or more subcarriers, and to map the parallel bits from each user of the second set of users to the one or more subcarriers allocated to the respective user;
   wherein mapping of the user data to the first and second set of subcarriers includes frequency domain mapping.

2. The apparatus of claim 1, wherein the plurality of transmission path circuits comprise a first subassembly that includes the spreader circuit that is coupled to the first mapping circuit for spread data and a second subassembly that includes the converter circuit that is coupled to the second mapping circuit for non-spread data.

3. The apparatus of claim 2, wherein the first subassembly and second subassembly are coupled with a third subassembly for both spread and non-spread data including a transform processor, and wherein the parallel chips and the parallel bits are provided to the transform processor.

4. The apparatus of claim 1, wherein the spreader circuit is configured to spread the first input data with a spreading code to generate a plurality of chips and to convert the chips into the parallel chips.

5. The apparatus of claim 1, wherein the subcarrier allocation includes time domain and frequency domain hopping for a user.

6. The apparatus of claim 1, wherein spreading of the first set of user data is in both the time domain and the frequency domain.

7. The apparatus of claim 1, wherein the spreader circuit is coupled to the first mapping circuit to map common pilot data to a third set of subcarriers including one or more subcarriers.

8. The apparatus of claim 1, wherein the plurality of transmission path circuits provide processing for data transmission in one or more of fourth generation (4G) wireless communications or long term evolution (LTE) data communications.

9. The apparatus of claim 1, further comprising one or more antennas for the transmission of the user data.

* * * * *